F. F. SIMONS.
PROPELLING MECHANISM.
APPLICATION FILED OCT. 30, 1918.
1,355,109.
Patented Oct. 5, 1920.
3 SHEETS—SHEET 3.
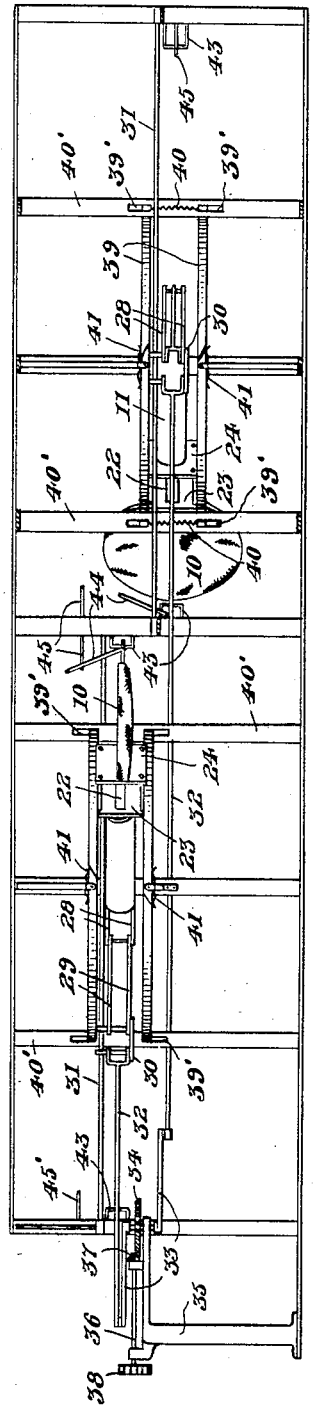
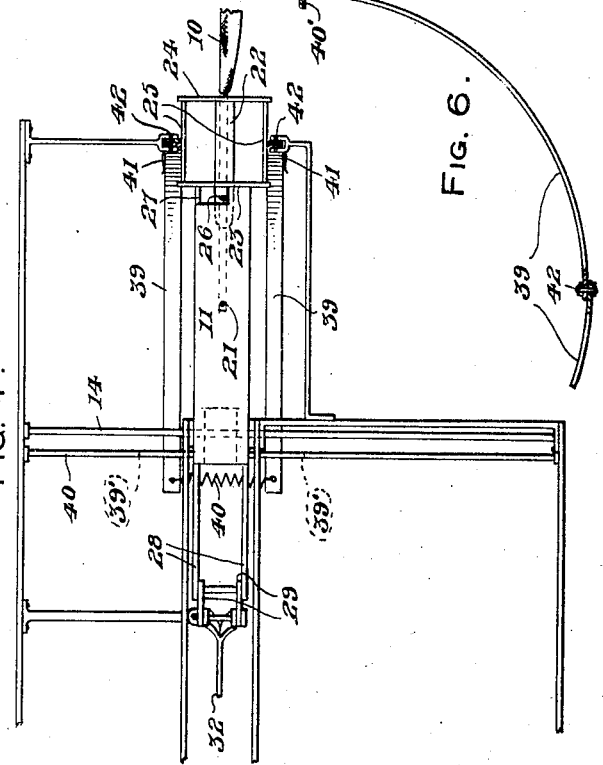
Inventor
F. F. Simons
By A. M. Wilson
Attorney

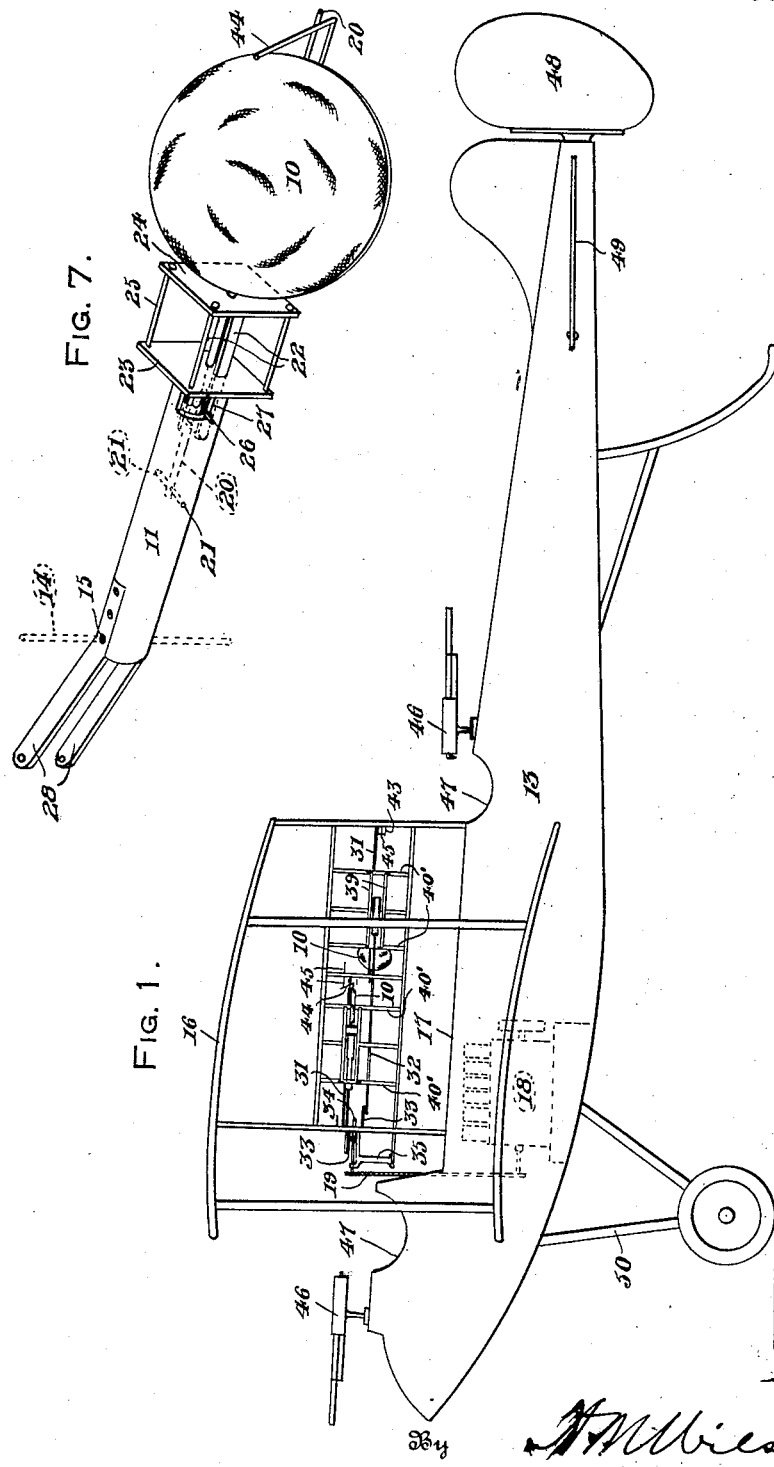

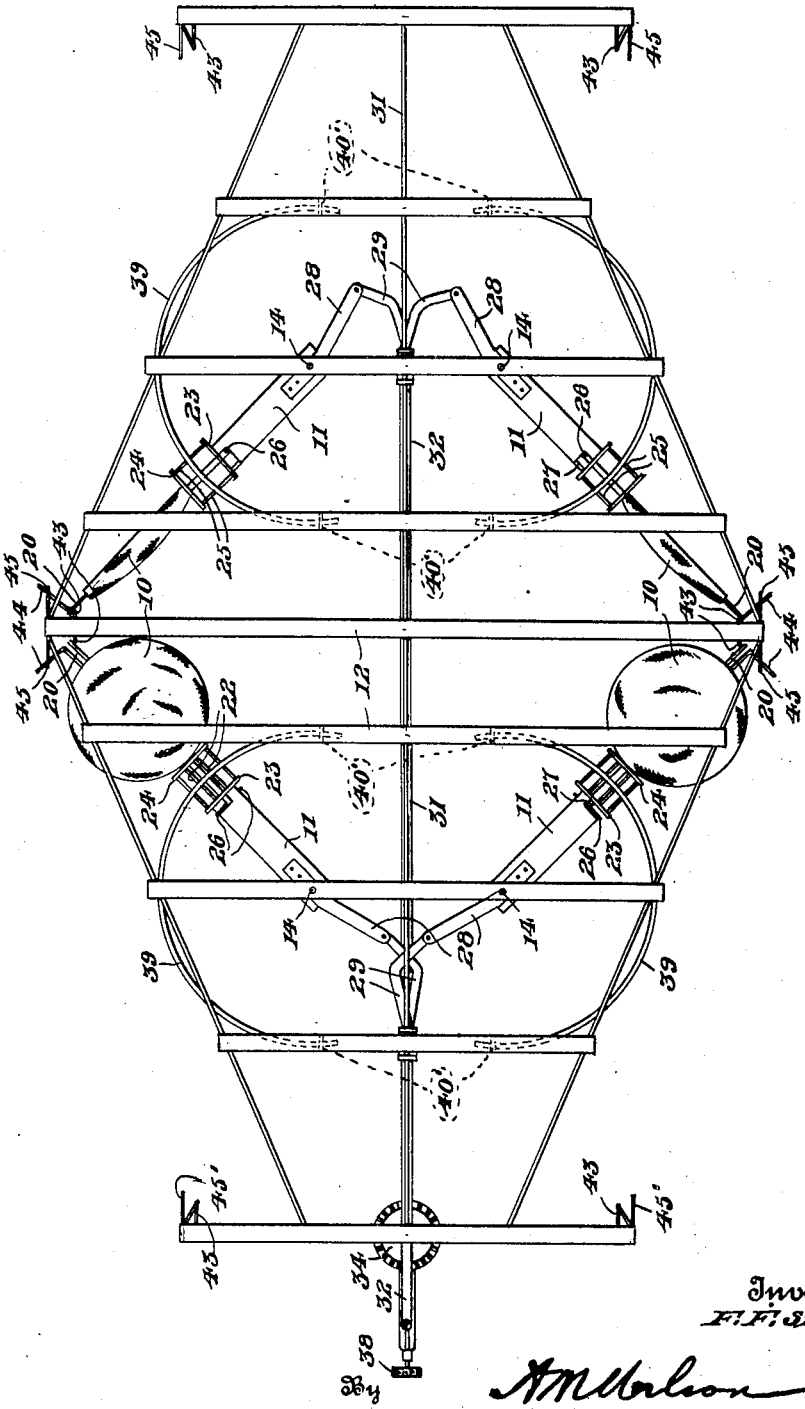

UNITED STATES PATENT OFFICE.

FRANK F. SIMONS, OF HARMONY, PENNSYLVANIA.

PROPELLING MECHANISM.

1,355,109.   Specification of Letters Patent.   Patented Oct. 5, 1920.

Application filed October 30, 1918. Serial No. 260,283.

*To all whom it may concern:*

Be it known that I, FRANK F. SIMONS, a citizen of the United States of America, residing at Harmony, in the county of Butler and State of Pennsylvania, have invented certain new and useful Improvements in Propelling Mechanism, of which the following is a specification.

The primary object of the invention is the provision of propelling means, especially designed for aircraft but also serviceable for boats and vehicles whereby the same are mechanically operated in any direction and at any desirable speed under the control of the operator, the mechanism being simple in construction and possessing great strength.

A further object of the invention is to provide propelling blades for an aircraft having a movement similar to feathering oars in rowing, means being provided for maintaining the blades vertically during their operative stroke and horizontally while recovering during the return stroke of the blades.

A still further object of the invention is the provision of motor-driven rowing means for air and similar craft which is positive in its operation, imparting uniform continuous impulses thereto during flight, the mechanism being out of the way of the operators of the craft as well as gunners and observers carried by the craft.

With these general objects in view the invention will now be fully described in connection with the accompanying drawings in which like reference characters designate corresponding parts throughout the several views.

In the drawings,

Figure 1 is a side elevation of a bi-plane provided with my invention,

Fig. 2 is a top plan view of the invention as positioned upon the aircraft,

Fig. 3 is a side elevation of the same parly in vertical longitudinal section,

Fig. 4 is a vertical transverse sectional view of a portion thereof enlarged,

Fig. 5 is a detail vertical sectional view illustrating the operation of one of the blade retainers, Fig. 6 is a horizontal sectional view of a portion of one of the retainer members and Fig. 7 is a perspective view of one of the blade members detached.

Referring more in detail to the drawings, the invention broadly consists of a plurality of what may be termed aerial oars each including an aileron 10 mounted for partial rotation upon a carrying arm 11, the oars being mounted in pairs or sets within the framework 12 provided for the mechanism upon the fuselage 13 of the aircraft by means of upright shafts 14 passing through the arms 11 as at 15. The mechanism framework 12 is preferably positioned beneath the upper plane or main aerofoil 16 of the air craft above the deck 17 thereof while an explosive or other form of motor 18 is carried within the fuselage having operative connections with the arms 11 by means of a sprocket chain 19 and other connections herein noted.

An axle 20 preferably projects from the arm 11 being anchored therein as at 21 and having the aileron 10 journaled upon said axle by means of a split sleeve 22. A cage is carried by the sleeve 22 between the arm 11 and aileron 10 having its opposite ends in the form of rectangular disks 23 and 24 positioned adjacent the outer end of the arm 11 and the inner edge of the aileron 10, while the disks 23 are connected together by rods 25 at the four corners of the cage. Oppositely projecting pins 26 are carried by the sleeve 22 projecting outwardly through opposite cutaway portions 27 adjacent the outer end of the arm 11, whereby the turning of the sleeve 22, cage and aileron 10 is limited in its movement upon the axle 20.

Extensions 28 project from the inner end of the arm 11 pivotally attached by means of angular links 29 with a head 30 slidable upon a guide wire 31 secured longitudinally within the mechanism frame 12. A link 32 pivotally connects the head 30 with a crank 33 carried by a gear 34 journaled in a bracket 35 within the frame 12 while a stub shaft 36 has a pinion 37 at one end in constant mesh with a gear 34 and a sprocket wheel 38 at its opposite forward end over which the chain 19 is adapted to travel.

The cage of each aileron 12 is slidably positioned between normally parallel arcuate guards positioned outwardly of the shafts 14 within the frame 12, the said guards being substantially semi-circular and each consisting of two portions or halves 39. An upper and a lower one of these side guards engages the rods 25 at opposite sides of the cage and the portions 39 of said guides being connected together at their free ends by springs 40 as well as having depressing leaf springs 41 adjacent their outer pivotal connecting points 42, the guides are normally maintained resiliently against the adjacent sides of the cages.

The guide portions 39 are freely shiftable through vertical slots 39′ in flat upright braces 40′ of the frame 12, thereby permitting the separation of the guide portions 39 and limiting the movements thereof.

The head 30 is reciprocated longitudinally of the wire 31 by the motor 18 which swings the arms 11 and aerofoils 10 back and forth forwardly and rearwardly during the rowing operation, suitable stops 43 being carried by the frame 12 for engaging the terminal portions of the axles 20 outwardly of the aerofoils and limiting the forward movement thereof at each extremity of its swinging path of travel. An angular trip 44 is carried by each aerofoil 10 adapted to engage a forwardly projecting pin 45 when the aerofoil approaches the rearward limit of its movement, thereby turning the aerofoil from its vertical to its horizontal position. A similar pin 45′ rearwardly projects from a forward portion of the frame 12 to be engaged by the trip 44 when the aerofoil approaches its forward limit of travel thereby turning the aerofoil from its horizontal to its vertical position.

In either position of the aerofoil, the guides 39 bearing upon the rods 25 of the cage of the aerofoil resiliently maintains the aerofoil 10 in its vertical position during its forward recovering stroke in its inoperative position. The continuance of the operation of the motor 18 continuously operates the blades 10 after the manner of rowing and the engagement of the blades 10 with the air forces the craft forwardly upon its travel. Any desired number of similar aerofoils 10 may be employed, two sets being herein illustrated designated by corresponding reference characters, it being seen that the manner of operatively connecting the different sets of aerofoils with the cranks 33 of the gear 34 is such as to cause each set of aerofoils to swing simultaneously but in opposite directions. A uniform motion of the craft is in this manner effected.

Suitable guns 46 may be provided upon the fuselage 13 adjacent wells or seating portions 47 thereof. A vertical rudder 48 may be provided for the craft as well as horizontal rudders 49 and a wheeled chassis or carriage 50.

What I claim as new is:—

1. A device of the class described comprising framework adapted for mounting upon a craft, arms swingingly mounted laterally of the frame operating means for said arms, an aileron journaled outwardly of each arm, a cage carried by each journal, means for automatically turning the ailerons to operative and inoperative positions and resilient positioning means for the aileron in constant engagement with each cage whereby the ailerons are alternately maintained in their operative and inoperative positions.

2. A device of the class described comprising framework adapted for mounting upon a craft, arms swingingly mounted laterally of the frame operating means for said arms, an aileron journaled outwardly of each arm, a cage carried by each journal, resilient positioning means for the aileron in constant engagement with each cage whereby the ailerons are alternately maintained in their operative and inoperative positions, movement limiting means for the aileron and arms carried by the frame and tripping means whereby the ailerons are automatically shifted to their vertical inoperative positions upon the approach of the ailerons to their forward limit of movement.

3. A device of the class described comprising framework adapted for mounting upon a craft, arms swingingly mounted laterally of the frame operating means for said arms, an aileron journaled outwardly of each arm, a cage carried by each journal, resilient positioning means for the aileron in constant engagement with each cage whereby the ailerons are alternately maintained in their operative and inoperative positions, movement limiting means for the aileron, arms carried by the frame and tripping means whereby the ailerons are automatically shifted to their vertical inoperative positions upon the approach of the ailerons to their forward limit of movement, and also shift the ailerons to their inoperative horizontal positions at the approach of the ailerons to their rearward limit of travel.

4. Propelling means for aircraft comprising a frame carried by the craft, a pair of opposite swinging arms pivoted within the frame, a longitudinally movable head operatively linked to the said arms, axles projecting from said arms, a cage and aileron journaled upon each axle adjacent the outer ends of said arms, means adapted for limiting the revolving of said ailerons and cages when the ailerons are positioned vertically and horizontally, means adapted to automatically shift the ailerons to vertical position at the forward extremity of the stroke of said arms and to their horizontal position at the rearward extremity of such stroke and resiliently mounted positioning means for the ailerons in constant engagement with said cages.

5. Propelling means for aircraft comprising a frame carried by the craft, a pair of opposite swinging arms pivoted within the frame, a longitudinally movable head operatively linked to the said arms, axles projecting from said arms, a cage and aileron journaled upon each axle adjacent the outer ends of said arms, means adapted for limiting the revolving of said ailerons and cages when the ailerons are positioned vertically and horizontally, means adapted to automatically shift the ailerons to vertical position at the forward extremity of the stroke of said arms, and to their horizontal position at the reaward extremity of such stroke, pairs of normally parallel semi-circular guards carried by said frame with said cages slidably positioned therebetween, braces carried by the frame having vertical slots through which said guides extend adapted for limiting the movements of said guides, springs connecting the free end portions of said guides, each of said guides being in two parts pivotally connected together adjacent their outer ends and compressing springs for the outer ends of said portions of the guides.

6. A device of the class described comprising a swinging arm, an aerofoil journaled for partial rotation at the free end thereof, a positioning cage carried by the aerofoil, arcuate two-part guards mounted upon opposite sides of the cage in constant engagement therewith, resilient connections between the opposite portions of said guides, and means for automatically turning the aerofoils to operative and inoperative positions.

7. A device of the class described comprising a swinging arm, an axle projecting from said arm, a cage and an aileron mounted for partial rotation upon said axle, means for automatically turning the ailerons to operative and inoperative positions, rotation-limiting means for said cage and aileron, substantially semi-circular spaced guards engaging the opposite sides of said cage, each of said guides being formed of equal arcuate portions pivotally connected together at their outer ends, spring connections between the free end portions of each guard portion, positioning springs for each guard portion adjacent the pivotal point thereof, whereby the guides resiliently maintain the cage with the ailerons alternately positioned vertically and horizontally.

8. A device of the class described comprising a swinging arm, an axle projecting from said arm, a cage and an aileron mounted for partial rotation upon said axle, rotation-limiting means for said cage and aileron, substantially semi-circular spaced guards engaging the opposite sides of said cage, each of said guides being formed of equal arcuate portions pivotally connected together at their outer ends, spring connections between the free end portions of each guard portion, positioning springs for each guard portion adjacent the pivotal point thereof, whereby the guides resiliently maintain the cage with the ailerons alternately positioned vertically and horizontally, means adapted for swinging said arm forwardly and rearwardly, means for limiting the swinging movement of the arm and automatic means adapted for shifting the aileron from its inoperative horizontal to its operative vertical position and vice versa in approaching its forward and rearward limits of travel respectively.

In testimony whereof I affix my signature.

FRANK F. SIMONS.